United States Patent
Ayyagari et al.

(10) Patent No.: US 6,879,572 B1
(45) Date of Patent: *Apr. 12, 2005

(54) POWER CONTROL FOR ACTIVE LINK QUALITY PROTECTION IN CDMA NETWORKS

(75) Inventors: Deepak V. Ayyagari, Watertown, MA (US); Anthony Ephremides, North Bethesda, MD (US)

(73) Assignees: Verizon Laboratories Inc., Waltham, MA (US); Genuity, Inc., Cambridge, MA (US)

( * ) Notice: Subject to any disclaimer, the term of this patent is extended or adjusted under 35 U.S.C. 154(b) by 928 days.

This patent is subject to a terminal disclaimer.

(21) Appl. No.: 09/643,288

(22) Filed: Aug. 22, 2000

Related U.S. Application Data

(60) Provisional application No. 60/169,849, filed on Dec. 9, 1999.

(51) Int. Cl.$^7$ .......................... H04B 7/216; H04Q 7/20
(52) U.S. Cl. ...................... 370/335; 370/342; 455/69; 455/226.2; 455/522
(58) Field of Search ................................ 370/320, 328, 370/329, 331, 332, 333, 335, 342; 455/13.4, 38.3, 68, 69, 226.1, 226.2, 226.3, 422, 450, 453, 501, 507, 517, 522

(56) References Cited

U.S. PATENT DOCUMENTS

| | | | |
|---|---|---|---|
| 5,548,812 A | * 8/1996 | Padovani et al. | 455/442 |
| 5,574,982 A | * 11/1996 | Almgren et al. | 455/69 |
| 5,715,526 A | * 2/1998 | Weaver et al. | 455/126 |
| 5,722,044 A | * 2/1998 | Padovani et al. | 455/443 |
| 5,722,051 A | * 2/1998 | Agrawal et al. | 455/69 |
| 6,044,072 A | * 3/2000 | Ueda | 370/335 |
| 6,070,084 A | * 5/2000 | Hamabe | 455/522 |
| 6,278,701 B1 | * 8/2001 | Ayyagari et al. | 370/335 |

* cited by examiner

*Primary Examiner*—Alpus H. Hsu
(74) *Attorney, Agent, or Firm*—Leonard C. Suchtya, Esq.; Joel Wall, Esq.; Rader Fishman & Grauer PLLC

(57) ABSTRACT

The present invention relates to a system and method for dynamically limiting the power of all users of a CDMA digital data link to maximize throughput and reduce interference among users of the link. In the operation of the data link, the maximum power available from each user of the link is determined along with the minimum power needed from each user to meet its link service requirement, that is, quality of service and frame error rate requirements. The maximum to minimum power ratio is derived for each user and the lowest power ratio, that is, the power ratio closest to unity is selected and used to scale upward the minimum power levels of all users of the data link. The resulting power level establishes the interference margin or slack available for all users of the data link and the interference slack available for new users to be admitted to the data link.

16 Claims, 2 Drawing Sheets

POWER CONTROL FOR ACTIVE LINK QUALITY PROTECTION IN CDMA NETWORKS

This application claims benefit of application Ser. No. 60/169,849 filed on Dec. 9, 1999.

FIELD OF THE INVENTION

The present application claims priority based on the provisional application Ser. No. 60/169,849, filed on Dec. 9, 1999, the entire contents of which are incorporated by reference. The present invention relates to protecting a Code Division Multiple Access (CDMA) data network from excessive interference in order to maintain the quality of service of the data network. A power control approach is disclosed to scale the power of all active links to achieve link protection and improved tolerance to interference.

BACKGROUND OF THE INVENTION

Broadband CDMA systems, in the near future, will provide a wide range of multi-media services including voice, data, and video. With multi-media traffic, users present the network with a range of bandwidth and quality of services (QoS) requirements.

The performance of a CDMA system is interference limited. Interference can cause disruption in the service of dedicated bandwidth or circuit data users who have been admitted into the system and guaranteed frame error rate and throughput targets. In order to provide the quality of service ("QoS") guaranteed to data users, the interference in the system must be tightly controlled. Multi-access interference can be regulated by controlling the transmit powers of the users. Power control techniques that are designed only to combat fading, suffer the problem that an active new user can cause the signal to noise ratios of operational users to drop below their required threshold. Therefore, power control techniques must be designed to adjust the power when new users are admitted to the system, to maintain their guaranteed quality of service and for active link quality protection.

A detailed mathematical analysis of the affect of transmit power on the interference margin in a communications channel and how the link protection algorithm of the present invention was derived is presented in the following references, which are hereby incorporated by reference in their entirety:

D. V. Ayyagari and A. Ephremides in Power Control for Link Quality Protection in Cellular DS-CDMA Networks with Integrated (Packet and Circuit) Services. MOBICON 99 (Conference) Sep. 15, 1999.

D. V. Ayyagari, Capacity and Admission Control in Multi-Media DS-CDMA Wireless Networks. Ph.D. Dissertation, University of Maryland, College Park, 1998.

SUMMARY OF THE INVENTION

In Code Division Multiple Access (CDMA) systems the capacity is a function of the total interference on the system, which in turn depends on the received powers of all the users sharing the same frequency spectrum. A dynamic power control algorithm is used to control the received signal strength at the base station of a CDMA network. The transmit power levels of users are controlled by up/down commands issued on a forward link from the base station.

The base station dynamically computes the maximum received signal strength available from each user including the effect produced by path gain over the signal path to the base station. The base station then computes the minimum power required from each user that will meet the QoS and frame error rate requirements of each user. The maximum to minimum power ratio is determined for each user and the power ratio closest to unity, the weakest link, is determined. The weakest link power ratio is then used to scale upwardly the minimum power level of each user to provide the optimal operating power that will meet each user's "Quality of Service" (QoS) and frame error rate requirements with the lowest addition of interference to the network.

DETAILED DESCRIPTION

For simplicity, the present invention will be described as used with a cellular communication system 1 having mobile user 2 in communications with a cell base station 3. The inventive system is implemented at the base station 3 but it is applicable to both the forward and reverse links 4-1, 4-2 (collectively referred to as the link 4). Forward=base to mobile, while reverse=mobile to base.

Figure 1:
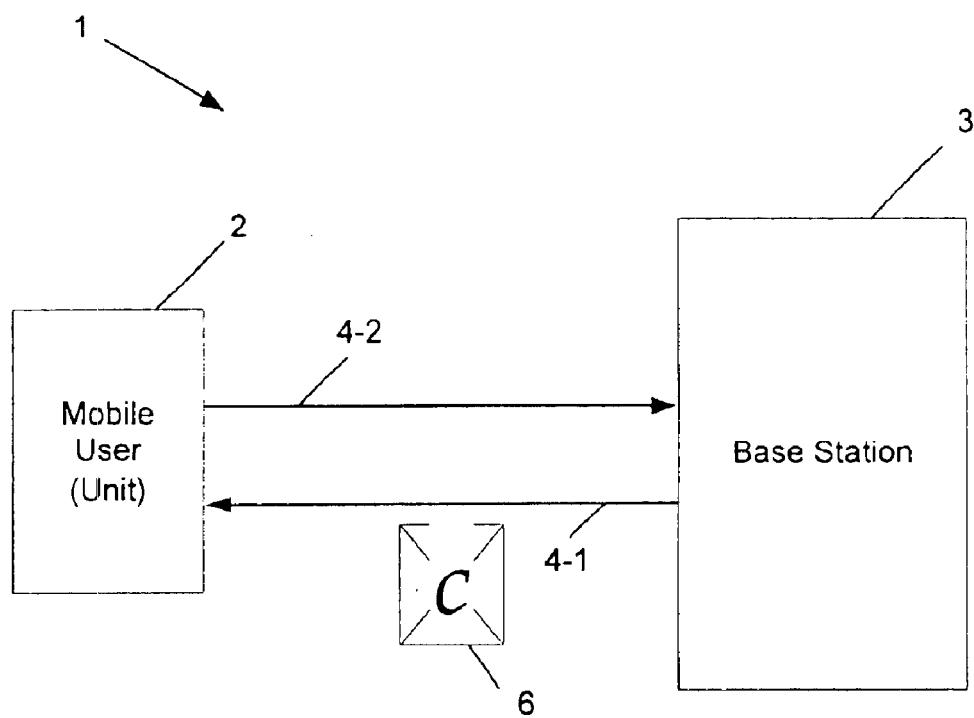
FIG. 1 illustrates an application of an embodiment according to the present invention in a cellular communication environment.
Figure 2:
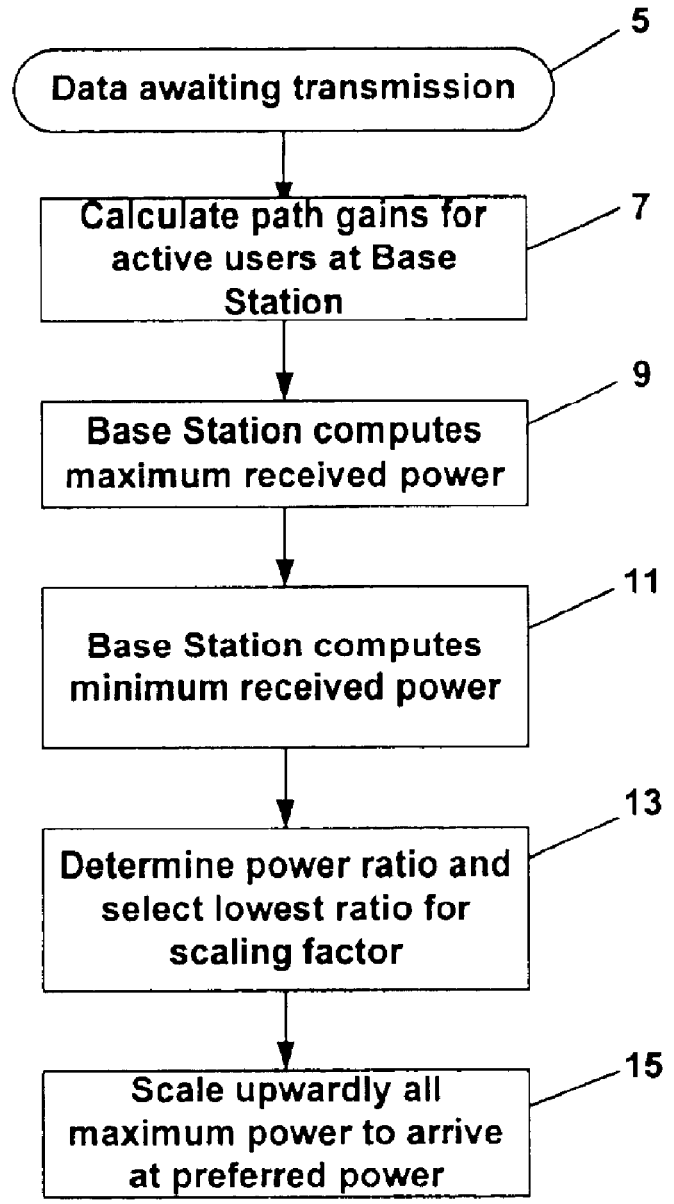
FIG. 2 illustrates the steps in the algorithm of the present invention.

The link protection process begins at 5 of FIG. 2, where each user 2 of the network is currently operating at individual power levels sufficient to meet its signal to noise ratio and quality of service requirements. The transmit power levels of the users 2 are controlled by the base station 3 via up/down commands 6 (shown in FIG. 1) issued on the forward link 4-1. At this step, the mobile units 2 are operating at a power greater than the minimum required for their signal to noise ratios but less than or equal to their peak transmit power capability which is fixed by battery power. The weakest link needs a minimum transmittal power almost equal to the maximum transmittal power.

The base station 3 at step 7 dynamically calculates the path gain for each of the mobile units 2. This can be done by the base station 3 issuing a command 6 to the mobile unit 2 to transmit at a known power level and then measuring the received power. Received power=$T_x$ x path gain.

At step 9, the base station 3 computes the maximum received power possible from each mobile unit 2. At connection or communication set-up, the mobile unit 2 identifies the type of mobile unit 2 being used. The peak transmit power capability of each class of mobile unit 2 is known to the base station 3. From the path gain measurements, the base station 3 computes the maximum received power possible from each mobile user 2. The maximum received power equals peak transmit power times path gain.

At the next step 11, the base station 3 computes the minimum received signal power it needs to receive in order to maintain the quality of service and frame error rate requirements. The limitations of the base station 3 are known so the minimum received signal must be strong enough to overcome these limitations to meet the user's 2 service requirements. The minimum received power can be computed using the same equation used to solve for maximum received power but substituting minimum received power, which is known, and solving for minimum transmit power. Like the maximum power, it can also be determined by sending command signals 6 from the base station 3 ordering the mobile unit 2 to reduce power until the signal to noise ratio is reached where the mobile unit 2 is just meeting its quality requirements. Testing in this manner, however, adds unnecessary noise to the data link.

A power ratio is then determined at 13 by dividing the maximum received power of each mobile unit 2 by the minimum received power each mobile unit 2 needs to meet its signal to noise ratio and quality requirements. The lowest power ratio determined for all of the mobile units 2, the power ratio of the weakest link, is selected for use as the scaling factor. The weakest link needs a minimum transmittal power almost equal to the maximum transmittal power.

The lowest power ratio or scaling factor is used at 15 to raise the minimum transmit power of all of the active mobile units 2. The base station 3 raises the powers of all active mobile units 2 by the up/down commands 6 on the forward link 4-1 by the scaling factor.

If the network is not heavily loaded, it is possible to raise the operating power of the active users 2 on the network. Therefore, it is necessary to determine an alternate scaling which does not raise the user powers beyond what is necessary. Let $\hat{B}$ be the required interference margin. Then the scaling factor a that would provide the interference margin $\hat{B}$ can be determined as follows:

$$\hat{B} = \frac{\hat{a} s_i^{min}}{T_i} - \sum_{j \neq i} \hat{a} s_j^{min} - \eta$$

$$\hat{a} = \frac{\hat{B} + \eta}{\frac{s_i^{min}}{T_i} - \sum_{j \neq i} s_j^{min}}$$

where i is the index of the code that has lowest minimum power $s_i^{min}$. This results in the lowest power vector, which maintains link quality and provides the desired interference margin $\hat{B}$.

In accordance with the Telecommunications Industry Association's interim standard IS-95 the power control algorithm can issue update instructions at the rate of 800 updates/second to each active mobile user 2. Operating at approximately 850 MHz the path gain for a mobile unit 2 can change in a matter of inches. Interfering structures and foliage have a significant affect on the path gain.

Knowing the path gain as determined by the base station 3, it issues a command 6 for each active mobile unit 2 to transmit at a known power. (The base station 3, upon initial contact with the mobile user 2, ascertains the type of equipment the mobile unit 2 is using. The base station 3 has stored in memory the characteristics of the mobile unit 2 and what its power capability is for the unit 2.) The base station 3 then measures the power received. Knowing the path gain and the received power, base station 3 determines the maximum received power possible at the base station 3 for each user's mobile unit 2.

The link protection system will preferably be used continuously while the network is in operation to dynamically determine the operating power of the active mobile users 2 since the power ratio or scaling factor and the path gain vary continuously as a user 2 moves relative to the base station 3. The system is proven to yield significant improvements in capacity while maintaining the quality of service guarantees made by the network to high capacity users 2 currently active on the system.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for controlling a level of interference on a CDMA network having mobile units in contact with a base station comprising the following steps:
   determining a received power of a first signal from each mobile unit;
   determining a received power of a second signal from each mobile unit;
   determining a power ratio of said first signal relative to said second signal;
   selecting a lowest power ratio from all of the power ratios determined; and
   using said lowest power ratio to scale upwardly a transmit power used to produce said second signal to establish a new transmit power for each mobile unit on the CDMA network.

2. A method for controlling a level of interference on a CDMA network as set forth in claim 1, wherein each said second received signal is lower in power than said first received signal.

3. A method for controlling a level of interference on a CDMA network as set forth in claim 1, wherein said second received signal is a minimum received signal each mobile unit can use which still meets a signal to noise ratio requirement.

4. A system for controlling a level of interference on a CDMA network having mobile units in contact with a base station, comprising:
   means for causing said mobile units to send a first signal to said base station;
   means for determining a path gain of said first signal;
   means for delivering a received signal strength of a second signal using the path gain of said first signal;
   means for determining a received signal strength of a third signal, lower in power than said second signal, using the path gain of said first signal;
   means for using the received signal strengths of said second and third signals at said base station for determining a power ratio for each of said mobile units;
   means for selecting a lowest power ratio; and
   means for using said lowest power ratio for scaling upwardly a transmit power each of said mobile units used for said second signal to set a new transmit power level for each of said mobile units on said CDMA network.

5. A system for controlling a level of interference on a CDMA network as set forth in claim 4, wherein said second signal is lower in power than said first signal.

6. A system for protecting a wireless digital communications network from interference from a use of excessive power by mobile users in active communication with a base station, comprising:
   means for determining a maximum received power capability of each mobile user at said base station;
   means for determining a minimum received power, which is capable of meeting communications quality requirements of each mobile user with said base station;
   means for determining a ratio of said maximum received power to said minimum received power of each mobile user;
   means for determining a lowest mobile user power ratio; and
   means for using said lowest user power ratio to scale upwardly a minimum power of each mobile user, which scaled power is set as a mobile user operating power by said base station.

7. A system for controlling interference in a CDMA wireless communications network having mobile users in contact with a base station, comprising:
   means for determining a maximum received power of each mobile user at said base station;

means for determining a minimum received power each mobile user can use while maintaining an acceptable communications link between the mobile user and said base station;

means for determining a ratio of said maximum received power to said minimum received power of each of said mobile users and for determining a lowest power ratio used; and means for using said lowest power ratio to scale upwardly a transmit power of each mobile user that was used to produce said minimum received power at said base station to arrive at a new transmit power for each mobile user to use in communication with said base station.

8. A CDMA cellular communications network wherein an active mobile user in contact with a base station via a link is operating at a power level determined by multiplying a minimum power that said active mobile user can use for quality communication with said base station by a scaling factor determined by a lowest ratio of maximum received power to said minimum received power of all of said active mobile users at said base station.

9. A method for reducing a level of interference of a CDMA cellular communications network comprising:

determining a maximum received power of each user of the network at a base station;

determining a minimum received power of each user, which is capable of maintaining quality communication with said base station;

calculating a power ratio for each user by dividing a user's maximum received power by the user's minimum received power;

selecting a lowest power ratio to use as a scaling factor; and multiplying a power level used by each user in determining said minimum received power by said scaling factor to arrive at a new power level for use in communication with said base station.

10. A method for maintaining communication quality of a wireless digital data network comprising:

determining a maximum received power from each active network user;

determining a minimum received power from each active network user, said minimum received power being representative of a minimum level of power that each active network user can use while maintaining quality communication within a frame error rate;

determining a maximum received power to minimum received power ratio of each active network user; and scaling upwardly a transmitting power of each active network user by multiplying a transmit power which produced said minimum received power by a lowest power ratio to produce a new operating power level for each active network user not already operating at said new operating power level.

11. A method for maintaining communication quality of a wireless digital data network as set forth in claim 10, wherein the transmitting power of each active network user is controlled at a level determined by a ratio of maximum to minimum received power of a weakest active network user.

12. A wireless digital communications network comprising:

a base station;

at least one link; and at least one active network user in communication with said base station via said at least one link, wherein an operating power of each active network user is scaled upwardly by a lowest maximum to minimum received power ratio determined for all said active network users.

13. A wireless digital communications network as set forth in claim 12, wherein the operating power of each active network user is determined by multiplying a power used to produce a minimum received power by the maximum to minimum received power ratio of a weakest active network user.

14. A method for providing active link quality protection while improving capacity in wireless communication systems, comprising the steps of:

for a plurality of active users, recognizing error rate requirement and minimum and maximum transmit power capabilities for each active user;

assigning a first power level to each active user;

assigning a minimum transmit power so each active user's desired error rate is satisfied;

determining a maximum received power possible from any of said plurality of active users;

determining a smallest ratio of peak received power to minimum received power of each active user; and for each active user, scaling said minimum transmit power that was used to produce a minimum received signal by the smallest ratio determined above.

15. A method for adjusting power of new and active users and providing active link quality protection and improving capacity in wireless communication systems, through the steps of:

assigning feasible power levels to active users having minimum and maximum transmit power capabilities;

determining a minimum transmit power required by the active users so that each active user's desired error rate is satisfied;

determining a maximum received power possible from any of the active users based on device peak transmit power capability and propagation characteristics;

determining a weakest link; that is, the active user with smallest ratio of peak received power to minimum received power;

scaling transmit powers of the active users by the ratio determined above if maximum capacity is desired; and scaling transmit powers of all active links by a factor less than an optimal as determined by a number of new users to be activated and a resulting new interference that must be tolerated.

16. A method for adjusting power of new and active users and providing active line quality protection and improving capacity in wireless communication systems as set forth in claim 15, wherein for less than optimal conditions, a scaling factor $\hat{a}$ is used to scale said transmit powers of said active links where:

$$\hat{a} = \frac{\hat{B} + \eta}{\dfrac{s_i^{min}}{T_i} - \sum_{j \neq i} s_j^{min}}$$

* * * * *